Patented Dec. 14, 1926.

1,611,043

UNITED STATES PATENT OFFICE.

WILBUR H. JUDY, OF BUFFALO, NEW YORK, ASSIGNOR TO SUMET CORPORATION, OF BUFFALO, NEW YORK, A CORPORATION OF NEW YORK.

METALLIC COMPOSITION.

No Drawing. Application filed June 24, 1924. Serial No. 722,065.

My invention relates generally to a metallic composition having a comparatively high lead content, and more particularly to a composition of copper, zinc, and lead, or one of copper, zinc, tin, lead, and in some cases other metals.

Those familiar with the art know that it is practically impossible to make a mixture of copper, zinc, and lead, or copper, zinc, tin, lead, and other metals for extruding, rolling, or drawing such compositions if the lead content is greater than 3% or 3½%.

It is likewise well known that when metal compositions are made for drawn tubing such compositions are usually practically free from lead since the lead is forced out during the formation of the composition under the pressure of the drawing operation since the wall section of such tubing is usually very thin.

It has been heretofore an unsolved problem of the art to make a stable composition of copper, lead, and zinc, having within reasonable limits any desired lead content. By means of my invention, I am able to make mixtures suitable for successful extruding, rolling, or drawing, which contain a much greater percentage of lead than has heretofore been possible.

Another advantage attained by means of my invention is that I am able to turn out brass rods and drawn brass tubing which possess very desirable easy free-cutting qualities thus making high speed machining possible.

Moreover my invention is such that it can be carried out very efficiently and economically.

In order to produce the desirable composition above referred to I treat the metallic lead which is to be used in the composition in the manner described in my copending application for Letters Patent of the United States of America, Serial No. 656,522, filed August 9, 1923. As therein described, I first take the metallic lead and melt the same in some suitable receptacle. When the lead is in a molten condition, the temperature is gradually increased to approximately 800° F. Into the molten mass, I then introduce pure hydrogen, or hydrogen which is substantially free from oxygen, or hydrogen combined with other non-oxidizing gases. Preferably such hydrogen or other non-oxidizing gases are in a highly heated condition when so introduced into the molten mass. This treatment causes a violent agitation of the molten mass and such agitation is permitted to continue for from one minute to ten minutes depending upon the quality of the lead being treated, and the amount of sulphur content or other impurities present in such metallic lead.

After this treatment, the lead may be run into bars or pigs for future use, or it may be added immediately to the other metals used in making the desired metallic composition.

The metallic lead subjected to such treatment is thus rendered substantially pure since the action of the hydrogen is such that the sulphur content and other impurities present in the metallic lead are driven off.

Metallic lead thus treated will easily and quickly amalgamate with copper, zinc, tin, or other metals in a manner quite impossible had such lead been added when it contained sulphur, arsenic, or other impurities.

In producing my metallic composition, I use from 1% to 20% of lead purified as described; from 55% to 75% of copper; and from 20% to 40% of zinc. A composition which is suitable for many uses is one composed of 6% of purified lead; 60% of copper, and 34% of zinc. The several ingredients are subjected to a suitable heat to melt them, and the composition is then poured into the desired forms for future use. Moreover, if desired, other metal such as manganese, nickel, or molybdenum may be advantageously employed in the mixture for special uses.

The amount of purified lead used in the composition is governed by the characteristics which it is desired to give the finished product. If, for example, it is desired that the finished product be extremely soft and easily machined, or drawn, or rolled, then a large percentage of lead should be employed in the composition. If on the other hand, it is desired to give the finished product the characteristic of being hard, then the quantity of purified lead placed in the composition should be reduced to a minimum.

In practice, I have found that when compositions of copper, zinc, and lead, or copper, zinc, lead, and other metals or copper, zinc, tin, and lead are produced in the manner described the product is homogeneous, and possesses qualities heretofore referred to, which the practices of the prior art have been unable to produce. Moreover, I have found it possible to produce by means of my invention machined brass goods much more economically than when the ordinary metals are used as has heretofore been the practice, because the higher lead content allows of higher cutting speeds in machining.

In the appended claims, when I refer to purified lead, I mean lead which has been treated with hydrogen free from oxygen, or hydrogen combined with other non-oxidizing gases, such as carbon monoxide, as clearly set forth hereinbefore.

Having thus described my invention what I claim is:

1. A metallic composition varying in proportions from 1% of purified lead, 75% of copper, and 24% of zinc, to 20% of purified lead, 55% of copper, and 25% of zinc.

2. A metallic composition comprising 6% of purified lead, 60% of copper, and 34% of zinc.

In testimony whereof, I have hereunto signed my name.

WILBUR H. JUDY